June 16, 1964 R. K. ORTHUBER ETAL Re. 25,598

APPARATUS AND METHOD FOR DETECTING OVERHEATED JOURNAL BOXES

Original Filed Jan. 25, 1954 3 Sheets-Sheet 1

INVENTORS
RICHARD K. ORTHUBER
CHARLES V. STANLEY

BY Albert Reiss
ATTORNEY

APPARATUS AND METHOD FOR DETECTING OVERHEATED JOURNAL BOXES

Original Filed Jan. 25, 1954 3 Sheets-Sheet 2

INVENTORS
RICHARD K. ORTHUBER
CHARLES V. STANLEY
BY
Albert Reiss
ATTORNEY

APPARATUS AND METHOD FOR DETECTING OVERHEATED JOURNAL BOXES

Original Filed Jan. 25, 1954 3 Sheets-Sheet 3

INVENTORS
RICHARD K. ORTHUBER
CHARLES V. STANLEY
BY
Albert Reiss
ATTORNEY

United States Patent Office

Re. 25,598
Reissued June 16, 1964

25,598

APPARATUS AND METHOD FOR DETECTING OVERHEATED JOURNAL BOXES

Richard K. Orthuber, Sepulveda, and Charles V. Stanley, Grenada Hills, Los Angeles, Calif., assignors to International Telephone & Telegraph Corporation Original No. 2,856,539, dated Oct. 14, 1958, Ser. No. 405,944, Jan. 25, 1954. Application for reissue May 24, 1962, Ser. No. 197,556
17 Claims. (Cl. 246—169)

Matter enclosed in heavy brackets [ ] appears in the original patent but forms no part of this reissue specification; matter printed in italics indicates the additions made by reissue.

The present invention relates to an apparatus and method for detecting overheated journal boxes of railroad vehicles.

A major problem confronting railroads is the fact that the journal bearings of the rolling gear become defective and as a result overheat during operation with consequent complete damage and wreckage of an entire train of cars often following. One method of determining whether or not a journal bearing is defective is to check the temperature of the bearing enclosures, commonly characterized as journal boxes. A box found to be hot has always been taken as an indication of impending trouble and ordinarily, as a preventive measure, the particular car concerned is withdrawn from the train until the defective condition is corrected.

One of the usual methods of determining whether or not a box is overheated is by sense of touch, the worker laying his hand on the box immedaitely following a normal train run. If the box is hot to the touch, such has been taken as an indication of trouble. This method of checking is obviously time consuming and unreliable in that the sense of touch is not accurate and the workers are subject to human error and carelessness. With the advent of ever-increasing train speeds, the seriousness of overheated journal boxes has greatly multiplied and many wrecks presumably could have been prevented had some positive method of detecting the journal box temperature been available shortly prior to the wreck. It is a principal object of this invention to provide a method and apparatus for detecting overheated journal boxes during normal operation of a train.

It is a further object of this invention to provide a method and apparatus for detecting overheated journal boxes by focusing radiation from the journal boxes onto an intfra-red ray detector which serves to produce a signal representative of the heated condition of the box.

In accomplishing this invention, heat radiation from the journal boxes of a traveling train is focused on a radiation detector for a fixed period of time. The exposure of this radiation to the detector is synchronized to coincide with the transit of the journal boxes. The output signal of the detector is evaluated by a utilizing means to provide an indication of the temperature condition of the respective journal boxes. This signal, if desired, may be used to actuate any type of a warning device or may be used to set stop signals.

For a better understanding of this invention, together with other and further objects, reference is made to the following description taken in connection with the drawings, the scope of the invention being defined by the claims.

Figure 1:
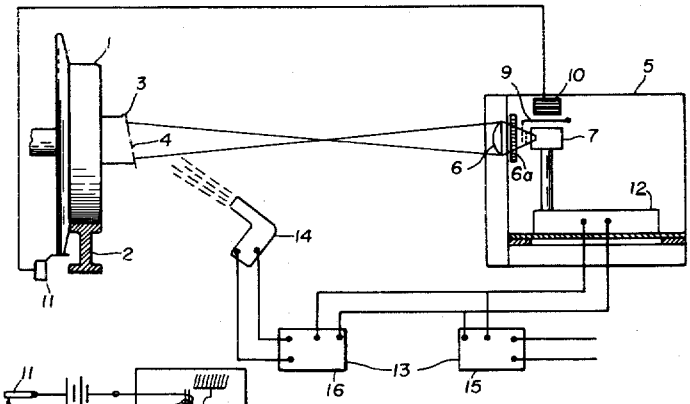
FIG. 1 is a diagrammatic illustration of one embodiment of this invention.
Figure 2:
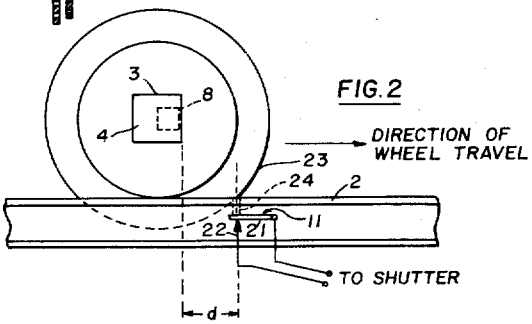
FIG. 2 is a graphic illustration, also in diagrammatic form, of a typical railroad car wheel in rolling position on a rail.

With reference to the drawings, and more particularly to FIG. 1, a conventional railroad car wheel 1 is shown as being in rolling position on a rail 2. The journal box 3 is of conventional design and serves to enclose the usual journal bearing and axle (not shown). As seen in FIG. 2, this journal box 3 is generally of square or rectangular shape on the end surface and in a typical construction measures approximately eight inches (8″) wide and eight inches (8″) high. When the journal bearing becomes overheated, the exposed face, indicated by the reference numberal 4, also becomes heated, and radiates infra-red energy.

The heat energy radiated from the box surface 4 is utilized by the detecting apparatus 5 for producing an electrical signal which is representative of the heated condition of the journal box, this signal having use in controlling the actuation of mechanical warning devices or similar devices which provide an observer with information as to the heated condition of the box.

This detecting apparatus 5 is composed of a focusing lens 6 and an infra-red detector 7 of any suitable construction such as the usual thermistor flake, thermocouple, and the like. In selecting a particular type of detector 7, it is preferred that its response be limited to the wave length of radiation above two (2) microns, since it is desired to measure heat radiation only as contrasted with light radiation of other wavelengths. The lens 6 is arranged to focus an image of the journal box face 4 onto the sensitive surface of the detector 7, and, as will be explained more fully in the following, to focus *at any instant* only a portion of the face 4 as indicated by the dashed line rectangle or square 8 of FIG. 2. A shutter mechanism, indicated by the reference numeral 9, is interposed between the lens 6 and detector 7 to control the projection of the box image onto the detector 7, this control being synchronized with the travel of the journal box 3. The shutter 9 is operated by a motor device 10 which is responsive to actuation of a switch 11 mounted adjacent the rail 2 in operative relationship with the railroad car wheel 1.

In general, the arrangement described in the foregoing operates in the following manner. Assuming the journal box 3 to be travelling at a given rate of speed, actuation of the switch 11 by the wheel 1 serves to energize the actuating device 10 which in turn opens the shutter 9. The normal condition of this shutter 9 is closed such that no radiation may fall on the detector 7 from the lens 6. The actuation of the switch 11, hence the opening of the shutter 9, is synchronized such that the journal box face 4 falls within the field of view of the lens 6 and detector 7, whereupon an image of a portion of the box face 4 (square 8) is focused onto the sensitive surface of the detector 7.

The shutter 9 is held open for a fixed period of time but in any event no longer than just prior to the box face 4 leaving the field of view of the lens 6. Thus, regardless of the speed of the train, an image of the journal box is focused on the detector 7 for the same fixed period of time, thereby providing a uniform exposure which may serve as the basis for computing box temperature. In order to accommodate train speeds up to fifty (50) miles per hour, the time-interval of shutter opening must be approximately five (5) milliseconds maximum.

It will be recognized at this point that the shutter performs two very important functions: (1) it excludes spurious radiation coming from sources other than the journal box, and (2) it causes the apparatus to operate independently of train speed.

The detector 7 produces an electrical signal which corresponds to both the radiation-density and exposure-time, but since the latter is a constant for all train speeds, the signal will vary only with changes in radiation-density. In general, this signal will vary in amplitude with variations in temperature of the journal box 3 and, as illustrated in FIG. 1, this signal is amplified by a suitable conventional amplifier circuit 12. This amplified signal is shown as being coupled to a suitable amplitude-discriminating circuit 13 which may be so arranged as to actuate a paint spray or the like gun 14 for marking the wheel 1 in the instance where the journal box 3 is overheated. The discriminator 13 is preferably composed of separate amplitude-sensitive circuits 15 and 16 which serve, respectively, to detect dangerously high and lower but still significantly above normal temperature conditions. In the instance where the box temperature is dangerously high, a signal is produced by the circuit 15 for operating a stop signal, for example, whereas the case of only a suspicious temperature is effective to operate the circuit 16 for energizing the spray gun 14. Obviously, the signal generated by the detector 7 may be utilized in any desired manner for indicating the temperature condition of the box 3 without departing from the scope of this invention.

Figure 7:
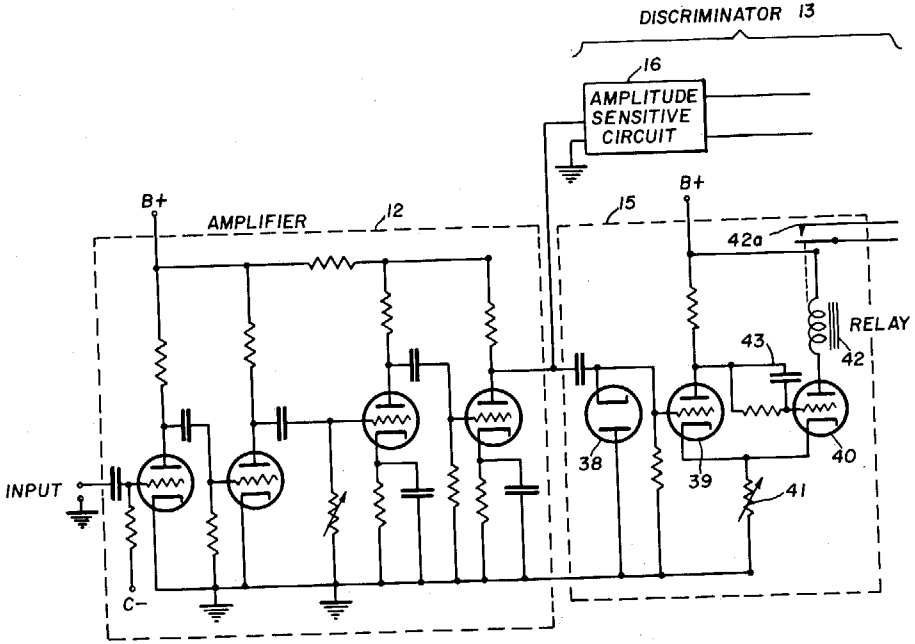
FIG. 7 is a circuit diagram of an amplifier and discriminator used with the foregoing.

Suitable amplifier and discriminator circuits are illustrated in FIG. 7. The amplifier 12 is a conventional resistance-coupled amplifier with sufficient gain for reliably operating the succeeding discriminator. The terminals marked "Input" are operatively coupled to the detector 7 which supplies a signal for amplification by the various amplifier stages. The amplified signal is taken from the anode of the final stage and fed to the discriminator *13 including amplitude-sensitive circuits* 15, 16 *each of* which comprises a diode 38 and two (2) triodes 39 and 40. A potentiometer or variable resistor 41 is coupled in the cathode circuits of the two tubes 39 and 40 for determining the grid bias on the tube 39. Hence, this potentiometer 41 determines the amplitude of the signal applied to the grid of tube 39 which will cause conduction. The diode 38 will conduct if any negative signals appear in this grid circuit and thereby serves as a clamp for establishing a substantially steady direct current voltage on the grid of tube 39.

In operation, the tube 40 is normally conductive and the tube 39 is cut-off. By applying a positive signal of sufficient amplitude to the grid of tube 39, the latter will be caused to conduct. The resulting reduced anode voltage is thereupon coupled to the grid of tube 40 causing the latter to cut-off and to actuate the relay 42 *which then closes its normally open contact 42a.* This tube 40 will remain in this non-conducting condition for a period of time as determined by the time constant of the resistor-capacitor network 43 which is coupled between the anode of tube 39 and the grid of tube 40. This time constant is so selected as to allow tube 40 to conduct for approximately forty (40) milliseconds, which in a practical instance is much greater than the duration of the signal impulse received from the detector 7, but much less than the minimum time between signals produced by consecutive journal boxes. *This 40-millisecond interval is of adequate duration to permit actuation of a relay or other electro-magnetic device.*

With the actuation of the relay 42, a positive indication is provided that a journal box is overheated.

While particular amplifier 12 and discriminator [15, 16] *13* circuits have been disclosed, various other circuit arrangements may be used as would occur to a person skilled in the art.

The restriction of the radiation intercepted by the detector 7 to the radiation which originates at the journal box 3 only is of prime importance for the reliable operation of this apparatus. If no focusing means 6 were used, the intercepted radiation would be proportional to the area of the sensitive surface of the detector 7 and inversely proportional to the square of the distance from the journal box, unless this distance is made quite negligible. This latter is an imperfect condition whereupon it is necessary to concentrate the radiation onto a small area of the approximate size of the sensitive surface of the detector 7. If this is accomplished by projecting a heat-image of the box surface 4 onto the detector 7, it is substantially certain that the radiation falling on the detector 7 originates exclusively from the box 3. This prevents radiation other than from the journal box from exciting the detector 7 and thereby causing spurious signals.

It is necessary that the optical system 6 be located vertically with respect to the journal box 3 so as to coincide optically with the journal box regardless of the size of the wheel 1 (within normal limits). Wheel flange radii vary from fourteen and one-half inches (14.5″) to seventeen and one-half inches (17.5″), whereupon it is desirable that the characteristics of the optics 6 be such that variations in wheel diameter will not carry the box face 4 vertically out of the field of view of the lens 6. In a practical instance, the lens 6 should see only five inches (5″) of the vertical dimension of the usual eight inch (8″) box, whereupon successive variation between two wheels of minimum and maximum diameter will not carry the vertical extent of either of the boxes out of the lens view.

In further consideration of the shutter construction 9, it is necessary to exclude radiation from hot brake shoes and the like. By synchronizing the shutter with the movement of the journal box such that it will open immediately after a journal box has entered the field of view of the detector and will close at a predetermined time, the only radiation which will fall on the detector 7 will be that originating from the box 3.

Concerning the particular construction of the shutter 9, any suitable well-known arrangement may be used; for example, photographic camera shutters which remain open for fixed periods of time upon actuation. The shutter actuating mechanism, indicated by the reference numeral 10, is operative to open the shutter 9 in response to actuation of the switch 11 by the wheel 1, the shutter remaining open for about five (5) milliseconds time elapse. It has been determined that a mechanical shutter of this type is not entirely satisfactory for this purpose, since it is operated an extreme number of times for a train of normal length and is subject to the usual mechanical wear and breakage. Therefore, while a mechanical shutter-actuating device has been disclosed as suitable, it will be apparent that any device such as a conventional electro-mechanical transducer 10a, may be used for this purpose without departing from the scope of this invention. Also it will be apparent that while the shutter 9 is interposed between the lens 6 and detector 7, it may be positioned any other place which is effective to control radiation falling on the detector 7, such as in front of the lens 6.

Figures 3A, 4, 5:
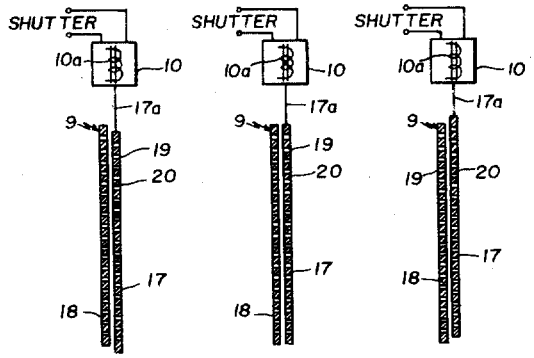
*FIG. 3A is a cross-section of shutter elements in unoperated, closed condition;*
FIG. 4 is a cross-section of shutter elements in open relationship.
FIG. 5 is a cross-section of the same shutter in *operated* closed condition.
Figure 3:
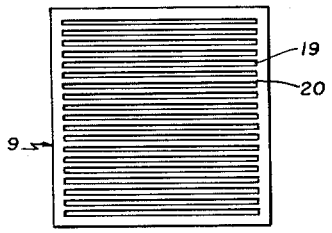
FIG. 3 is a front elevation of a shutter element.

A shutter device proven to be effective in this invention is illustrated particularly in FIGS. 3, *3A*, 4, 5 and 5a. *Referring to FIGURES 3A, 4, and 5 which diagrammatically show one embodiment of the shutter and are primarily intended to illustrate the general principle of operation of the shutter, this* [This] shutter is composed of one reciprocating member 17 and a fixed member 18, each of these members being provided with alternately arranged slots 19 and bars 20 which are of equal heighths and widths. The two plates 17 and 18 when positioned in registry as illustrated in FIG. 4 are considered to be open since radiation impinging the member 18 will pass through the slots 19 of both members. When the member 17 is moved upwardly a distance equal to one bar or slot width, as illustrated in FIG. 5, the shutter is effectively closed, since light passing through the slots 19 of member 18 will be stopped by the respective bars 20 of the member 17. This particular shutter construction is advantageous, because it permits control of a large beam cross-section with only very small member 17 displacement. This is a very desirable feature since the shutter 9 must respond almost instantaneously to the actuation of the switch 11 by the wheel 1. Normally the members 17 and 18 are out of register *as shown in FIGURE 3A* and the bars 20 of the movable member 17 block the slots 19 of the fixed member 18. As the movable member is raised a distance equal to the combined height of a slot and a bar *as shown in FIG. 4*, the slots in both members are in register for a period of about 5 milliseconds and the movable shutter comes to rest with the slots out of register *as shown in FIG. 5* rendering the shutter effectively closed. *Obviously, the effective open time of the shutter is a function of the speed of travel of member 17 and the height of a slot 19.* This is the electro-mechanical equivalent of a focal plane shutter known in photography.

To further restrict the radiation from the box 3 to that of heat only and to exclude whatever light may be reflected from the box, it is preferred to utilize an infrared filter 6a in conjunction with the lens 6, the composition of such filter being selected to provide high attenuation of wave lengths shorter than two (2) to three (3) microns but to transmit wave lengths of longer dimensions. Filters which are suitable for this purpose are magnesium oxide and camphor soot on nitro cellulose films. The preparation of such filters are described by A. H. Pfund in "Physical Review" of 1930, volume 36, page 71, and by R. B. Barnes and L. G. Bonner in J. O. S. A. of 1936, volume 26, page 428.

Figure 5A:
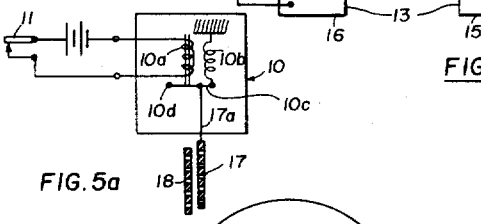
FIG. 5a is a diagrammatic illustration of one suitable device for use in connection with the shutter of FIGS. 4 and 5.

Having now fully described the detecting apparatus per se, the preferred method of synchronizing operation of this apparatus with transit of the journal box will be described. As explained earlier, the shutter receives an electrical signal or impulse when the box 3 enters the view of the detector 7. This impulse may be produced by the mere closing of the switch 11 to complete a circuit, the leading edge of the signal serving to open the shutter 9. Also as explained, the shutter 9 shall independently close approximately five (5) milliseconds (or other fixed period of time) later. This period of five (5) milliseconds is based on a maximum train speed of fifty (50) miles per hour. *Referring to the diagrammatic illustration of FIG. 5A which illustrates one embodiment of the shutter, cocking* [Cocking] or actuation of the shutter may be accomplished by use of an ordinary direct current solenoid 10a which energizes upon closure of the switch 11. The armature *10c* of the solenoid *10a* may be connected to the reciprocable member 17 as indicated by the line 17a, whereby energization of the solenoid will move the armature *10c about its pivot 10d* and the member 17 [to] *through* the position illustrated in FIG. 4 *and to the position illustrated in FIG. 5.* Since closure of the switch 11 results, in actuation of the solenoid and this switch will remain closed until after the wheel passes thereover, the shutter 9 will remain raised a finite period of time but effectively open for only 5 milliseconds, as previously explained. Therefore, depending upon the velocity of wheel travel, the shutter 9 will be held up for a corresponding period of time but radiation may only pass therethrough for a period of 5 milliseconds and thus the exposure is independent of the wheel velocity. The armature of the solenoid retracts under force of its *compressional* retracting [springs] *spring 10b* or the like lowering the shutter after the switch 11 opens following the pasage of the wheel 1.

Other means for energizing the shutter-actuating device 10 upon actuation of the switch 11 will occur to a person skilled in the art.

A suitable switching means is illustrated in FIG. 2 wherein the armature 21 of the switch 11 is closed on the fixed switch contact 22 by contact of the wheel flange 23 with an operating plunger or arm 24. This plunger is suitably supported adjacent the rail 2 such that it lies in the path of the wheel flange 23 and is depressed to rail top level at the moment switch 11 is closed. The closed or actuated condition of the switch 11 is specifically illustrated in FIG. 2. Upon switch actuation, the device 10 is operated for opening the shutter 9. The optical axis of the lens 6 is aimed to coincide with that portion of the box face as indicated by the reference numeral 8, the moment arm 21 engages contact 22. This portion 8 is immediately adjacent the leading or forward edge of the box.

The particular displacement between the point of actuation of the switch 11 and the optical axis of the lens 6 (indicated by the reference letter "d") is necessary to compensate for differences in wheel flange radii, which, as mentioned previously, varies from between fourteen and one-half inches (14.5") and seventeen and one-half inches (17.5"). By preselecting this dimension "d" in such a manner that the switch 11 will not be actuated until the box 4 comes into view for wheels of both diameters, the shutter may be made to open reliably at a time when the box portion 8 has completely entered the view of the detector 7. By limiting the duration of the shutter opening to five (5) milliseconds, the shutter will close prior to the box face 4 leaving the detector view area outlined by the box portion 8, this condition holding true for train speeds up to fifty (50) miles per hour and for box faces which measure eight inches by eight inches (8" x 8").

Since almost all track ways accommodate traffic in opposite directions, it is necessary to use an actuating arrangement which will operate the shutter 9 in either direction of train movement. Such an arrangement is illustrated in FIG. 6.

Two switches 25 and 26, which correspond to the previously described switch 11, are mounted in suitably spaced position adjacent rail 2 as described in connection with FIG. 2, and two direction-selector switches 27 and 28 are similarly mounted on opposite respective sides thereof as illustrated. In non-operating or idling condition, two conventional relay switches 29 and 30 make contact between the respective armatures and the fixed contacts 31 and 32. When actuated, the armatures of these relay-switches engage the fixed contacts 33 and 34, respectively. These relays 29 and 30 are provided with release-delay means of dash-pot or other conventional construction which delays opening of the armatures from the contacts 33 and 34 for a period of time corresponding to the time it takes a wheel to travel, for example, from switch 27 to switch 26. In the reverse direction, this delay would correspond to wheel travel from switch 28 to switch 25. Considering a train approaching from the left, switch 27 will be closed first. This serves to actuate relay 30 such that the respective armature engages contact 34. This disables completely the relay 29. Switch 26 is now placed in an active circuit such that actuation thereof by the wheel flange 23 will provide an impulse or signal at the terminals 35 and 36 from battery 37.

Figure 6:
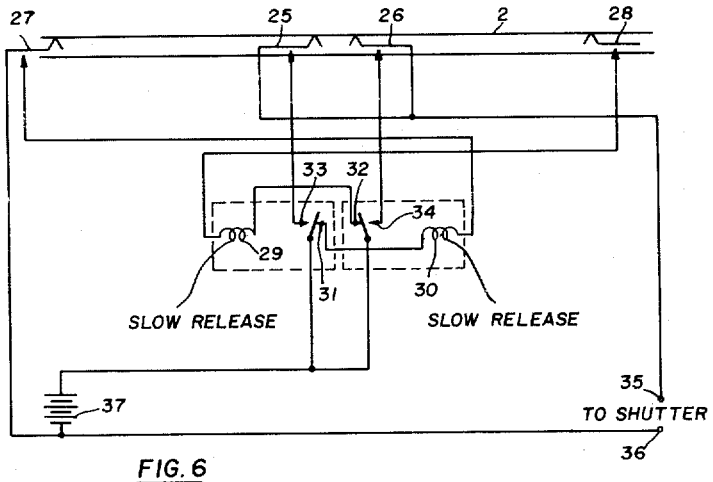
FIG. 6 is a circuit diagram of one shutter-actuating system adapted for use in the aforementioned embodiment.

While mechanical actuation in FIGS. 2 and 6 has been illustrated, other methods of controlling operation of the shutter 9 will be quite evident to a person skilled in the art. Such methods include the use of photoelectric cells or variable reluctance pick-up devices which are widely known and applied to such dynamic uses as that explained in the foregoing.

While there has been described what is at present considered the preferred embodiment of the invention, it will be obvious to those skilled in the art that various changes and modifications may be made therein without departing from the invention, and it is, therefore intended in the appended claims to cover all such changes and modifications as fall within the true spirit and scope of the invention.

What is claimed is:

1. Apparatus for detecting overheated journal boxes comprising heat-sensitive means for producing a signal in response to radiant energy projected thereonto, optical means projecting an image of radiant energy of predetermined size onto said heat-sensitive means, and interrupting means interposed between said heat-sensitive means and said projecting means and operative to control the exposure of said radiant energy image to said heat-sensitive means and to limit such exposure to a fixed period of time.

2. Apparatus for detecting overheated journal boxes comprising heat-sensitive means for producing a signal in response to radiant energy projected thereonto, optical means projecting an image of radiant energy onto said heat-sensitive means, and interrupting means operative to control the exposure of said radiant energy image to said heat-sensitive means and to limit such exposure to a fixed period of time, said interrupting means including a shutter operable to control the exposure of said image and timing means for operating the shutter.

3. Apparatus for detecting overheated journal boxes comprising heat-sensitive means for producing a signal in response to radiant energy projected thereonto, optical means projecting radiant energy onto said heat-sensitive means, and interrupting means operative to control the exposure of said radiant energy to said heat-sensitive means *for interrupting the generation of said signal,* said interrupting means including a shutter operable to control the exposure of said radiant energy, and timing means for operating the shutter, said timing means including switching means which is operated by the passage of railroad equipment, said switch means being operatively associated with said shutter to open the latter to expose said radiant energy to said heat-sensitive means upon operation of said switching means.

[4. Apparatus for detecting overheated journal boxes comprising an infra-red ray detector upon which an infra-red image may be projected, said detector being operative to produce a signal representative of said image, an optical system focusing said image toward said detector, shutter mechanism operatively positioned with respect to said optical system for controlling the time of projection of said image on said detector, motor means controlling the opening and closing of said shutter, and control means operatively coupled to said motor means for causing operation of the latter and for opening said shutter.]

[5. Apparatus for detecting overheated journal boxes comprising an infra-red ray detector upon which an infra-red image may be projected, said detector being operative to produce a signal representative of said image, an optical system focusing said image toward said detector, light-filtering means operatively positioned with respect to said optical system for limiting the wave-length of radiation transmitted by said optical system to the infra-red range, shutter mechanism operatively positioned with respect to said optical system for controlling the time of projection of said image on said detector, motor means for controlling the opening and closing of said shutter, and control means operatively coupled to said motor means for causing operation of the latter and for opening said shutter.]

6. Apparatus for detecting overheated journal boxes comprising an infra-red detector upon which an infra-red image may be projected, said detector being operative to produce a signal characteristic of the intenstiy of said image, an optical system focusing [said image] *an image of said journal box* onto said detector, light-filtering means operatively positioned with respect to said optical system for limiting the wavelength of radiation transmitted by said optical system to the infra-red range, shutter mechanism operatively positioned with respect to said optical system for controlling the projection of said image on said detector, motor means for controlling the opening and closing of said shutter, a switch device adapted to be operated by a railroad car wheel and having operative connections with said motor means, said device being mountable in such position to be actuated by movement of said wheel past a predetermined position, said operative connection between said device and said motor means serving to cause said shutter mechanism to open upon actuation of said switching device for exposing said image *of said journal box* to said detector.

7. The method of detecting hot journal boxes comprising the steps of focusing radiation images from journal boxes onto an infra-red ray detector for a fixed period of time, synchronizing the exposure of each journal box image to said detector with the transit time of the journal box such that said exposure will occur only during coincidence of the journal box with the field of view of said detector, and utilizing the signal produced by said detector upon said exposure to indicate the intensity of infra-red radiation from the respective journal box.

8. The method of detecting hot journal boxes comprising the steps of applying a radiation image of a portion of a moving journal box to a detector for a fixed period of time, synchronizing the exposure of said image to said detector with the transit time of the journal box such that said exposure will occur only during coincidence of the journal box with the field of view of said detector, and utilizing the signal produced by said detector upon said exposure to indicate the intensity of infra-red radiation from the respective journal box.

9. The method of detecting hot journal boxes comprising the steps of applying an infra-red radiation image of a portion of a moving journal box to a detector for a fixed period of time, synchronizing the exposure of said image to said detector with the transit time of the journal box such that said exposure will occur only during coincidence of the journal box with the field of view of said detector, and utilizing the signal produced by said detector upon said exposure to indicate the intensity of infra-red radiation from the respective journal box.

10. Apparatus for detecting overheated journal boxes of a moving train comprising means selectively actuable in accordance with the movement of said journal boxes past a given stationary point, heat-sensitive means producing a signal in response to radiant energy, optical means projecting an image of at least a portion of the respective journal boxes onto said heat-sensitive means, interrupting means selectively interrupting the projection of said image on said heat-sensitive means *for interrupting the generation of said signal,* and means operatively coupling the first-mentioned means to said interrupting means for operating the latter in synchronism with the moving journal boxes for transmitting a partial image of each journal box onto said heat-sensitive means.

11. Apparatus for detecting overheated journal boxes of a moving train comprising means selectively actuable in accordance with the movement of said journal boxes past a given stationary point, heat-sensitive means producing a signal in response to radiant energy, optical means projecting an image of at least a portion of the respective journal boxes onto said heat-sensitive means, means limiting the field-of-view of said projecting means to a position fixed in space, said position being in registry with the moving journal boxes, interrupting means operatively coupled to the first-mentioned means and operative only when each respective journal box coincides with said field-of-view to transmit said image to said heat-sensitive means, and means operating said interrupting means to sever transmission of said image to said heat-sensitive means following a predetermined lapse of time after the transmission of said image parts, whereby said interrupting means is controlled to transmit said image only when a journal box coincides with said field-of-view.

12. Apparatus for detecting overheated journal boxes comprising heat-sensitive means for producing a signal in response to radiant energy projected thereonto, optical means projecting an image of radiant energy onto said heat-sensitive means, normally closed shutter means for preventing said radiant energy from falling on said heat-sensitive means, and mechanism for opening said shutter means for a finite period of time.

13. Apparatus for detecting overheated journal boxes of a moving train comprising means selectively actuable in accordance with the movement of said journal boxes past a given stationary point, heat-sensitive means producing a signal in response to radiant energy, optical means projecting an image of at least a portion of the respective journal boxes onto said heat-sensitive means, means utilizing the signal of said heat-sensitive means to generate a signal representative of journal box temperature, and control means operatively coupled to the first-mentioned means for [controlling] *interrupting* the generation of the last-mentioned signal.

14. Apparatus for detecting overheated journal boxes of a moving train comprising means selectively actuable in accordance with the movement of said journal boxes past a given stationary point, heat-sensitive means including an amplifier for generating a signal in response to radiant energy, and control means operatively coupled between the first-mentioned means and said heat-sensitive means for *interrupting* [controlling] the generation of said signal.

15. Apparatus for detecting overheated journal boxes of a moving train comprising means selectively actuable in accordance with the movement of said journal boxes past a given stationary point, heat-sensitive means including an amplifier for generating a signal in response to radiant energy, and interrupting means responsive to actuation of the first-mentioned means for interrupting the generation of said signal.

[16. Apparatus for detecting overheated journal boxes of a moving train comprising signal-generating means adapted to be actuated by a moving train, and heat-sensitive means generating a first signal in response to actuation of said signal-generating means; said heat-sensitive means comprising a detector which produces an electrical signal in response to radiant energy, and an amplifier for amplifying said electrical signal, said amplifier having an output circuit across which appears said first signal.]

[17. Apparatus for detecting overheated journal boxes of a moving train comprising a switch adapted to be mounted on a rail for actuation by a wheel, heat-sensitive means for generating a signal in response to actuation of said switch, said heat-sensitive means comprising a photo-sensitive detector, an optical system for directing radiant energy from a journal box onto said detector, a discriminating circuit operatively coupled to said detector and which is responsive to said signal only when the latter exceeds a predetermined amplitude, said discriminating circuit having an output circuit, and an electro-mechanical transducer operatively coupled thereto, said transducer being operative in response to the signal produced by said discriminating circuit.]

18. Apparatus for detecting overheated journal boxes comprising an infra-red ray detector, an optical system for projecting radiant energy onto said detector, an amplifier operatively coupled to said detector, an electro-mechanical transducer operatively coupled to said amplifier and responsive to the signals produced thereby for indicating the radiant energy projected onto said detector, and a paint spray device operatively coupled to said transducer for providing a signal upon actuation of said transducer.

[19. The method of determining temperatures above a predetermined value of journal boxes comprising the steps of applying a radiation image of a portion only of a moving journal box to a detector, and utilizing the signal generated by said detector for indicating that the temperature of the journal box is above said predetermined value.]

20. The method of determining the temperatures above a predetermined value of journal boxes comprising the steps of applying a radiation image of a portion only of a moving journal box to a detector, and utilizing the signal generated by said detector for marking the train at a place proximate to a journal box having a temperature greater than said predetermined value.

*21. Apparatus for detecting overheated journal boxes of a moving train comprising means selectively actuable in accordance with the movement of said journal boxes past a given stationary point, heat-sensitive means including an amplifier for generating a signal in response to radiant energy, and interrupting means responsive to actuation of the first-mentioned means for interrupting the generation of said signal, said selectively actuable means being responsive to the movement of each said journal box past said stationary point, said interrupting means comprising signal interrupting means controlled by said actuable means for interrupting said generation of said signal except when each said journal box is in such a position along the trackway relative to said heat-sensitive means that the radiant energy emitted therefrom can be received by said heat-sensitive means, and means responsive to said signal from said heat-sensitive means for indicating the presence of an overheated journal box.*

*22. The apparatus defined in claim 21 which further includes optical means imaging a restricted portion only of each journal box onto said heat-sensitive means, said restricted portion being limited by said optical means to a first dimension which is substantially less than the length of the heat emitting surface area of said journal box in the direction scanned by said optical means as said journal box moves past said apparatus and being limited to a second dimension generally normal to both said first dimension and to the viewing axis of said optical means which is less than the corresponding dimension of said journal box by an amount at least equalling the expected variation in positioning of successive of said journal boxes in the direction of said second dimension, said optical means having its optical axis so aligned in said second dimension that said restricted portion imaged onto said heat-sensitive means substantially always lies within the confines of said heat-emitting surface of said journal box despite said variations in position of successive journal boxes.*

References Cited in the file of this patent or the original patent

UNITED STATES PATENTS 671,813 Callum ---------- Apr. 9, 1901

(Other references on following page)

UNITED STATES PATENTS

| | | |
|---|---|---|
| 1,716,775 | Hayes | June 11, 1929 |
| 1,810,172 | Hayes | June 16, 1931 |
| 1,901,192 | Reinhardt et al. | Mar. 14, 1933 |
| 1,901,208 | Vayda | Mar. 14, 1933 |
| 2,166,824 | Runaldue | July 18, 1939 |
| 2,224,077 | Haupt et al. | Dec. 3, 1940 |
| 2,237,193 | Mobsby | Apr. 1, 1941 |
| 2,412,165 | McDermott | Dec. 3, 1946 |
| 2,423,885 | Hammond | July 15, 1947 |
| 2,428,713 | Lindberg et al. | Oct. 7, 1947 |
| 2,477,819 | Newell | Aug. 2, 1949 |

| | | |
|---|---|---|
| 2,486,753 | Miller | Nov. 1, 1949 |
| 2,560,753 | Weinberg | July 17, 1951 |
| 2,620,435 | Vogt et al. | Dec. 2, 1952 |
| 2,674,154 | Crandell | Apr. 6, 1954 |
| 2,811,856 | Harrison | Nov. 5, 1957 |
| 2,985,759 | Goldsmith | May 23, 1961 |

FOREIGN PATENTS

| | | |
|---|---|---|
| 9,765 | Great Britain | Aug. 15, 1896 |

OTHER REFERENCES

"Industrial High Speed" (I.H.S.), by W. S. Gorrill, March 1949 issue of Electronics, pages 112–114.